United States Patent
Bucheru

(10) Patent No.: US 10,326,376 B2
(45) Date of Patent: Jun. 18, 2019

(54) CURRENT FED ACTIVE CLAMP FORWARD BOOST CONVERTER

(71) Applicant: Apple Inc., Cupertino, CA (US)

(72) Inventor: Bogdan T. Bucheru, Austin, TX (US)

(73) Assignee: Apple Inc., Cupertino, CA (US)

(*) Notice: Subject to any disclaimer, the term of this patent is extended or adjusted under 35 U.S.C. 154(b) by 47 days.

(21) Appl. No.: 15/840,154

(22) Filed: Dec. 13, 2017

(65) Prior Publication Data

US 2019/0097539 A1   Mar. 28, 2019

Related U.S. Application Data

(60) Provisional application No. 62/564,836, filed on Sep. 28, 2017.

(51) Int. Cl.

| H02M 3/335 | (2006.01) |
| H02M 3/158 | (2006.01) |
| H02M 3/155 | (2006.01) |
| H02M 7/48  | (2007.01) |
| H02M 1/00  | (2006.01) |
| H02J 9/06  | (2006.01) |
| H02M 1/10  | (2006.01) |

(52) U.S. Cl.
CPC ....... H02M 3/3353 (2013.01); H02M 3/1584 (2013.01); *H02J 2009/068* (2013.01); *H02M 1/10* (2013.01); *H02M 2001/0064* (2013.01); *H02M 2003/1552* (2013.01); *H02M 2007/4803* (2013.01)

(58) Field of Classification Search
CPC ............. H02M 3/3353; H02M 3/1584; H02M 2001/0064; H02M 2003/1552; H02M 2007/4803; H02M 3/33538; H02M 3/33546; H02M 3/33569; H02M 2001/0054; H02M 1/10; H02J 2009/068
See application file for complete search history.

(56) References Cited

U.S. PATENT DOCUMENTS

| 5,416,387 A * | 5/1995 | Cuk ................... H05B 41/28 315/209 R |
| 5,734,563 A | 3/1998 | Shinada |
| 7,321,224 B2 | 1/2008 | Iwamoto |

(Continued)

OTHER PUBLICATIONS

Han, et al., "A New Active Clamping Zero-Voltage Switching PWM Current-Fed Half-Bridge Converter," IEEE Transactions on Power Electronics, vol. 20, No. 6, Nov. 2005.

*Primary Examiner* — Fred E Finch, III
*Assistant Examiner* — Demetries A Gibson
(74) *Attorney, Agent, or Firm* — Blank Rome LLP

(57) ABSTRACT

A current fed active clamp forward boost (CAFB) converter can include a primary coil coupled to an input voltage and a main switch, an input choke serially coupled with the primary coil, and a clamp switch coupled to the primary coil, input choke, and a clamp capacitor. The main switch may operate to regulate an output voltage of the converter. The clamp switch may operate alternately with respect to the main switch, and the auxiliary switch may selectively couple a DC bus voltage to the primary coil. The converter can be operated in a CAFB mode if the input voltage is greater than the boost voltage threshold or in a current fed active clamp forward (CAF) mode if the input voltage is not greater than the boost voltage threshold.

19 Claims, 8 Drawing Sheets

(56) References Cited

U.S. PATENT DOCUMENTS

| | | | |
|---|---|---|---|
| 7,339,801 B2 | 3/2008 | Yasumura | |
| 7,518,895 B2 | 4/2009 | Shekhawat | |
| 7,869,235 B2* | 1/2011 | Lin | H02M 1/34 |
| | | | 363/21.18 |
| 8,315,073 B2 | 11/2012 | Matsumoto | |
| 9,077,254 B2 | 7/2015 | Orr | |
| 2002/0110005 A1* | 8/2002 | Mao | H02M 3/33592 |
| | | | 363/21.06 |
| 2005/0073861 A1* | 4/2005 | Ke | H02M 1/34 |
| | | | 363/20 |
| 2010/0039086 A1* | 2/2010 | De Stegge | H02M 3/1582 |
| | | | 323/282 |
| 2011/0032731 A1* | 2/2011 | Coleman | H02M 1/4258 |
| | | | 363/21.12 |
| 2013/0194698 A1* | 8/2013 | Sase | H02M 1/4258 |
| | | | 360/75 |
| 2013/0343099 A1* | 12/2013 | Eom | H02M 3/33569 |
| | | | 363/21.12 |
| 2014/0133188 A1* | 5/2014 | Nishiyama | H02M 1/34 |
| | | | 363/21.01 |
| 2015/0016153 A1* | 1/2015 | Orr | H02M 3/33538 |
| | | | 363/21.04 |

* cited by examiner

CURRENT FED ACTIVE CLAMP FORWARD BOOST CONVERTER

BACKGROUND

AC/DC converters, such as those used to charge and/or power electronic devices such as desktop computers, notebook computers, tablet computers, smartphones, and the like, may be required to work at a wide range of input voltages. For example, nominal input voltage in the US might be 120 VAC, while nominal input voltages in Europe and other regions might be 240 VAC. Thus, when accounting for safety margins, an operating range of 90 VAC to 265 VAC might be required. Traditionally, such converters produced a single output voltage, but the advent of the USB-PD (Universal Serial Bus Power Delivery) standard has introduced multiple output voltages as a requirement in some cases. In some embodiments, it might be desired to provide output voltages of around 5V for devices such as phones up to 20V or more for laptops. The wide range of input and output voltages has introduced a number of challenges into the design of such converters.

Traditionally, the flyback topology has been used for such converters, largely due to its design flexibility. However, the flyback topology often introduces other design issues, such as switching noise, high voltage rating requirements for components, parasitic capacitances associated with shielding requirements, large component values (e.g., bulk capacitors), etc., as well as increased losses associated with efficiency limitations inherent to existing flyback topologies. Additionally, as power requirements increase, power factor correction or other input current conditioning may be required to meet regulatory requirements. Historically, this has often led to two stage designs, which increase cost, reduce efficiency, and increase complexity of both the circuit and controller design.

Thus, what is needed in the art is a single stage converter design that can accommodate wide ranges of input and output voltages, while providing for increased efficiency, improved noise performance, reduced component values and ratings, and suitable input power conditioning.

SUMMARY

In some embodiments, a current fed active clamp forward boost (CAFB) converter can include a primary coil operatively coupled to an input voltage and a main switch. The CAFB converter can also include an input choke serially coupled with the primary coil and a clamp switch operatively coupled to the primary coil, input choke, and a clamp capacitor, with the clamp capacitor being operatively coupled to a DC bus of the converter. The switches may be configured so that the main switch operates to regulate a voltage appearing at an output of the CAFB converter, the clamp switch operates alternately with respect to the main switch, and the auxiliary switch selectively couples the DC bus voltage to the primary coil when the rectified input voltage is greater than a boost voltage threshold. The CAFB converter may further include a secondary coil magnetically forward coupled to the primary coil and a rectifier operatively coupled between the output of the converter and the secondary coil. The rectifier can be configured to permit forward current and to prevent reverse current through the secondary coil.

The CAFB converter may receive its input voltage at a junction between the auxiliary switch and the primary winding via a fast diode. The input voltage can be a rectified AC voltage or a DC voltage. The CAFB converter may have primary and secondary coils that are the primary and secondary windings of a transformer. The CAFB converter may be constructed such that the choke coil is integral with the primary coil, such as in a high leakage transformer. The CAFB converter may also include a clamp diode operatively coupled to at least one of the primary coil and the input choke and to the clamp capacitor so as to clamp a ringing voltage associated with the at least one of the primary coil and the input choke and one or more parasitic capacitances of the circuit. The CAFB converter may be constructed such that the main switch is operated to regulate a voltage appearing at an output of the converter by controlling a peak current through the primary coil responsive to a voltage feedback loop operatively coupled to a voltage at the output of the converter.

In some embodiments, a method of operating a CAFB converter can include comparing an input voltage of a CAFB converter to a boost voltage threshold and operating the main switch, the clamp switch, and the auxiliary switch of the CAFB converter in a CAFB mode if the input voltage is greater than the boost voltage threshold. Operating the main switch, the clamp switch, and the auxiliary switch of the CAFB converter in a CAFB mode can include operating the auxiliary switch of the CAFB converter to selectively couple a DC bus voltage of the converter to a primary coil of the CAFB converter. The method can further include operating the main switch, the clamp switch, and the auxiliary switch of the CAFB converter in a current fed active clamp forward (CAF) mode if the input voltage is not greater than the boost voltage threshold. Operating the main switch, the clamp switch, and the auxiliary switch of the CAFB converter in the CAF mode comprises closing the auxiliary switch of the CAFB converter to couple a DC bus voltage of the converter to a primary coil of the CAFB converter.

Operating the auxiliary switch of the CAFB converter to selectively couple a DC bus voltage of the converter to a primary coil of the CAFB converter can include cycling through a sequence of switching states. The first switching state can commence when the main switch is turned on, the clamp switch is turned off, and the auxiliary switch is on. The second switching state can commence when the auxiliary switch is opened with the main switch remaining on and the clamp switch remaining off. The third switching state can commence when the main switch is turned off and the clamp switch is turned on, with the auxiliary switch remaining off. The fourth switching state can commence when the auxiliary switch is turned on, with the main switch remaining off, and the clamp switch remaining on. Timing of the commencement of the third switching state may be controlled to regulate a voltage appearing at an output of the CAFB converter by controlling a peak current through the primary coil responsive to a voltage feedback loop operatively coupled to a voltage at the output of the converter.

Operating the CAFB converter in the CAF mode can include cycling through a sequence of switching states. The first switching state can commence when a main switch is turned on, a clamp switch is turned off, and the auxiliary switch is on. The second switching state can commence when the main switch is turned off, the clamp switch is turned on, with the auxiliary switch remaining on. The third switching state commencing when a current through a primary coil of the CAFB converter reverses polarity, while main switch remains off, and the clamp switch and the auxiliary switch remain on. Timing of the commencement of the second switching state can be controlled to regulate a voltage appearing at an output of the CAFB converter by controlling a peak current through the primary coil responsive to a voltage feedback loop operatively coupled to a voltage at the output of the converter.

DETAILED DESCRIPTION

Figure 1:
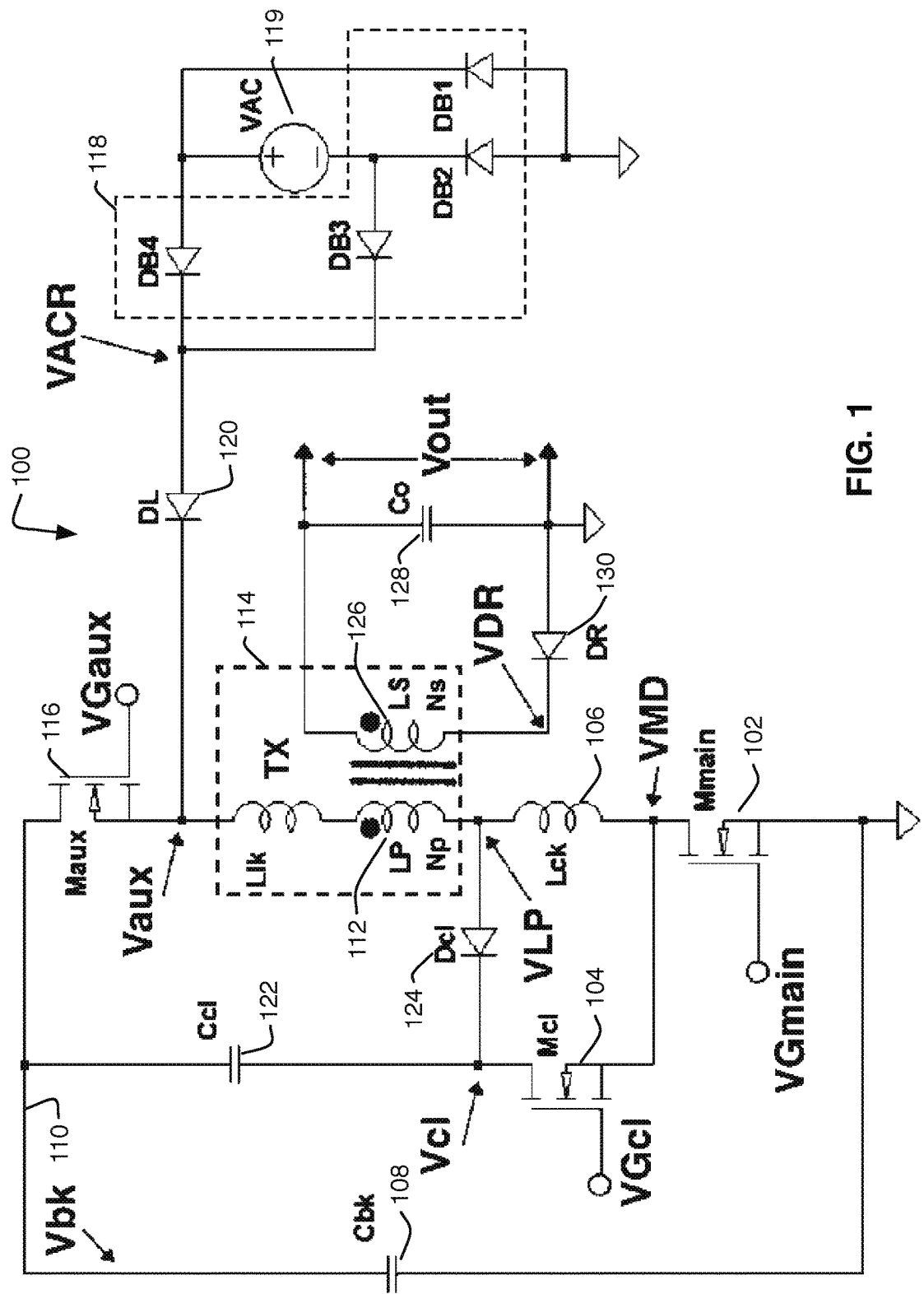
FIG. 1 illustrates a current fed, active clamp, forward, boost (CAFB) converter.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Disclosed herein is a single stage power converter topology that achieves many of the aforementioned desirable features for an AC/DC converter. This topology may be known as a Current fed, Active clamp, Forward, Boost (CAFB) converter, and one embodiment of such a converter is illustrated in FIG. 1. CAFB converter 100 includes a primary side (electrically connected to the primary winding of transformer TX 114) and a secondary side (electrically connected to the secondary winding of transformer TX 114). CAFB converter 100 includes a main switch Mmain 102 and a clamp switch Mcl 104 that alternately drive an input choke Lck 106. Main switch Mmain 102 will require a similar voltage rating to a forward converter designed for similar operating voltages and may, in some embodiments, require a lower voltage rating than for a flyback converter with similar rated voltages. Main switch 102 and clamp switch 104 have alternating drive signals (i.e., D and 1-D) such that one switch or the other is always driving the input choke Lck 106. As described in greater detail below, input choke Lck 106 is used to shape the input current and to selectively boost the voltage Vbk across bulk capacitor Cbk 108 (i.e., the voltage of DC bus 110).

Input choke Lck 106 has an end connected to one of the ends of the primary winding Lp 112 of transformer TX 114. In some embodiments primary winding Lp 112 and input choke Lck 106 may be integrated into a single component, such as a high leakage transformer. The other end of primary winding Lp 112 is connected to DC bus 110 by auxiliary switch Maux 116. As described in greater detail below, auxiliary switch Maux 116 may be used to control the connection between transformer TX 114 and bulk capacitor Cbk 108 and can also control current to primary winding Lp 112 of transformer TX 114 and input choke Lck 106. More specifically, these magnetic components may be used for voltage boosting and/or input power factor control rather than including a separate magnetic component and/or power conversion stage as done with conventional converters. Additionally, auxiliary switch Maux 116 does not switch the full range of input and/or DC bus voltages, but rather only sees the difference between the rectified AC input voltage VACR and the DC bus voltage Vbk. Thus, auxiliary switch Maux can have roughly half the voltage rating as required for main switch Mmain 102.

The common point between Maux and primary winding Lp 112 of transformer TX 114 (having voltage Vaux, discussed below) is connected to a bridge rectifier 118 made up of diodes DB1-DB4 by means of a diode DL 120, which may, in some embodiments be a fast diode. Bridge rectifier 118 receives the AC input voltage from input voltage source 119. In some embodiments, the input voltage source may be a DC voltage source, which may be directly coupled to diode DL 120 (omitting bridge rectifier 118). The primary side circuitry also includes a clamp capacitor Ccl 122 connected between clamp switch Mcl 104 and DC bus 110 and a clamp diode Dcl 124 connected between clamp capacitor Ccl 122 and common point between primary winding Lp 112 of transformer TX 114 and input choke Lck 106. Clamp diode Dcl 124 is provided to clamp ringing associated with the magnetic elements (i.e., primary winding LP 112 and input choke Lck 106) and the parasitic capacitances associated with the various circuit components. As a result, clamp diode Dcl 124 clamps ringing noise only, and not large currents. Thus, clamp diode Dcl 124 can be a low power/current device, with a relatively smaller voltage rating as compared to various other circuit components.

As noted above, CAFB converter 100 also includes secondary side circuitry, including secondary winding Ls 126 of transformer TX 114. Secondary winding Ls 126 has the same polarity as primary winding Lp 112, i.e., the transformer is forward connected, rather than reverse connected as in a conventional flyback converter. In this implementation, secondary winding Ls 126 has one end connected to a positive side of output capacitor Co 128 and the other end connected to a cathode of diode rectifier DR 130. The anode of diode rectifier DR 130 along with the negative side of output capacitor Co 128 are grounded. Because of the soft switching provided to diode rectifier 130 its operation may result in zero current switching and therefore reduced stresses on output capacitor Co 128. Thus, in at least some embodiments of CAFB converter 100, output capacitor Co 128 may be of a relatively smaller size relative to the output capacitors of flyback or other converter topologies. Additionally, diode rectifier DR 130 may, in some embodiments, see reverse voltages lower than for a flyback or forward converter operating with similar voltages and energy requirements. Thus, it may be possible to provide a diode having a lower voltage rating. Additionally, diode rectifier DR 130 may be replaced with a switching device, such as a MOSFET based synchronous rectifier.

Figure 5A:
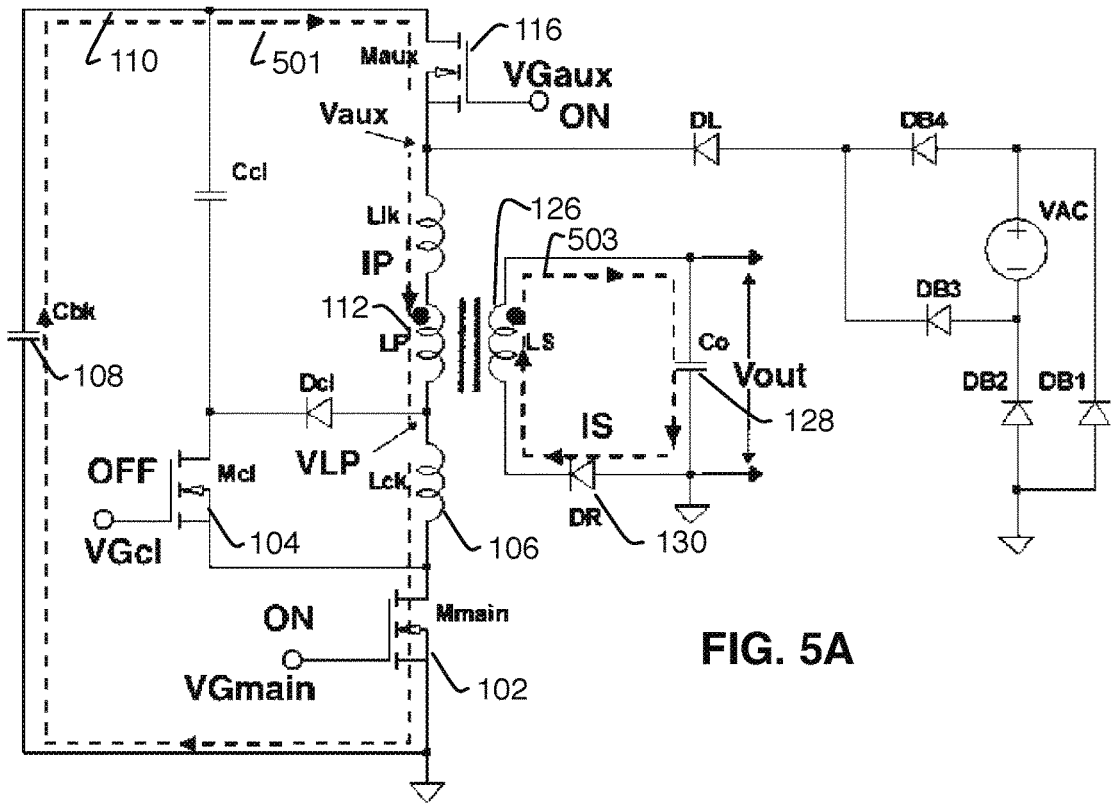
FIGS. 5A-5C illustrate switching states of a CAFB converter operating in the current fed, active clamp, forward (sans-boost) (CAF) mode.
Figure 5B:
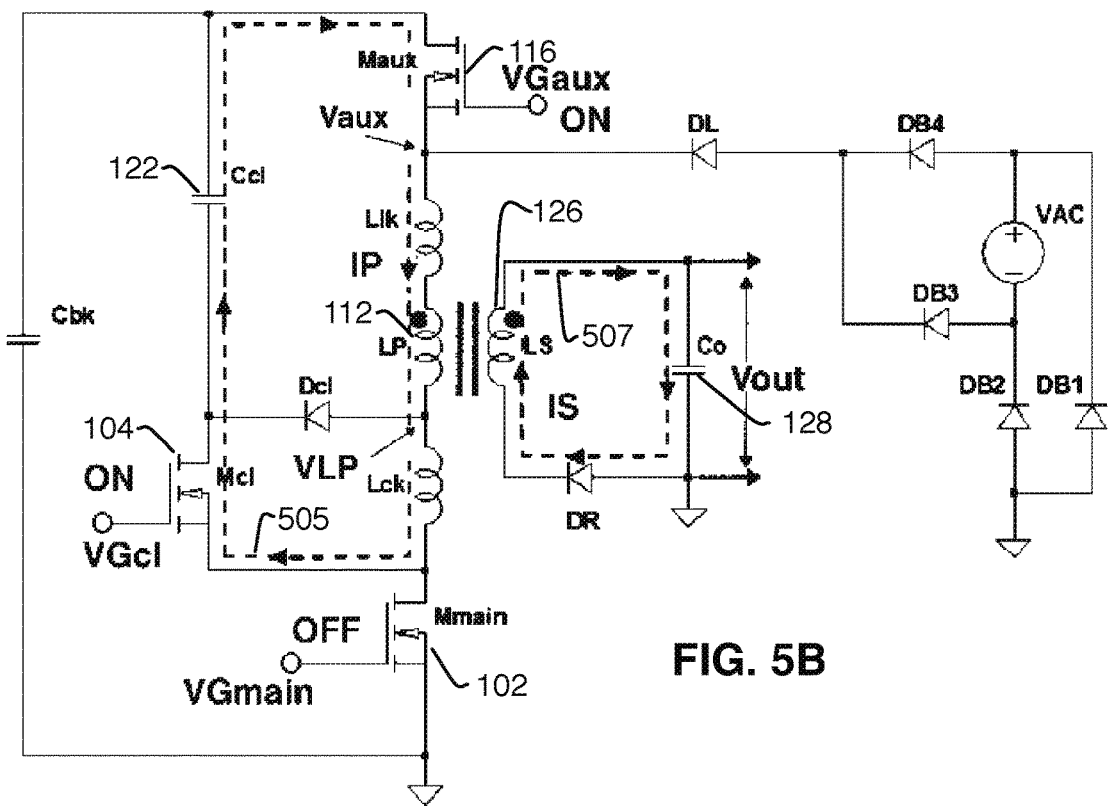
Figure 5C:
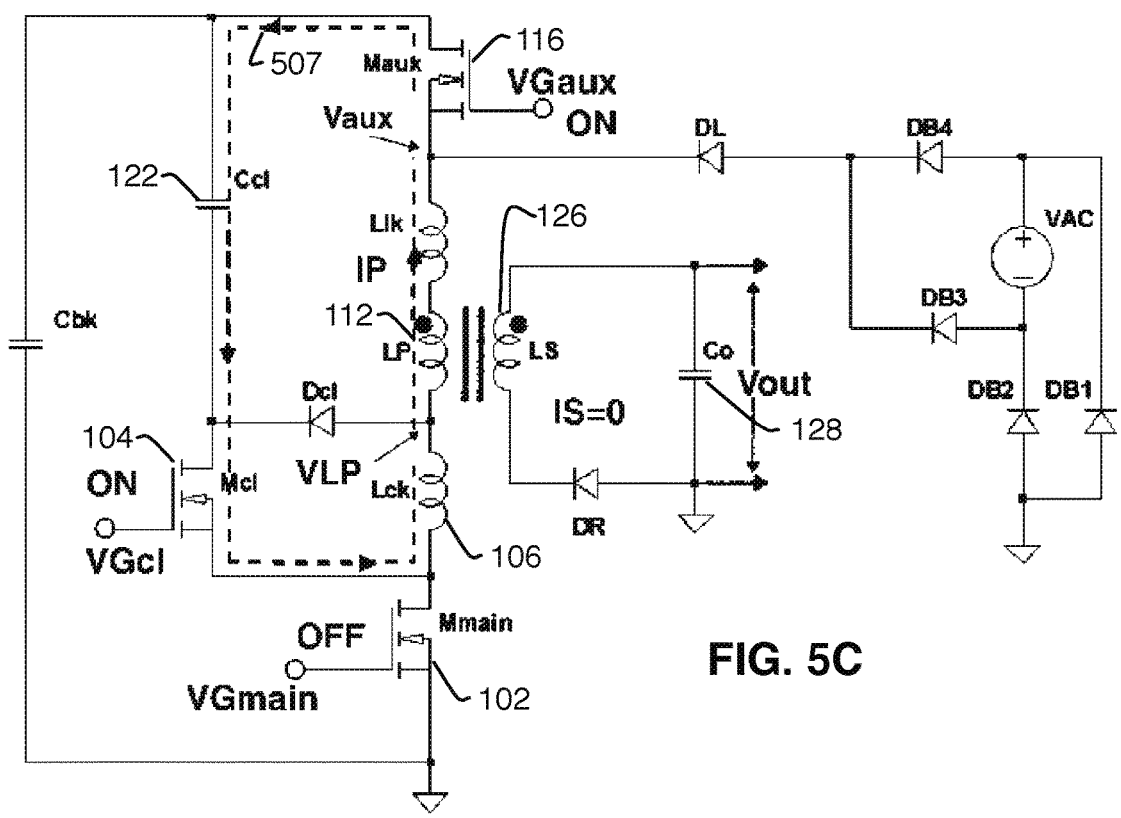

The CAFB converter 100 may be operated in two modes. In a first mode a boosting function using input choke Lck 106 may be implemented. This mode is referred to herein as a current fed, active clamp, forward, boost mode or CAFB mode. In a second, alternative mode, the boost function of input choke Lck 106 is not used. Converter 100 thus operates as a current fed, active clamp, forward converter (i.e., CAF mode). These two operating modes are described in greater detail below. More specifically, the switching sequence for CAFB mode operation is illustrated in FIGS. 2A-2D, with associated waveforms illustrated in FIG. 3. The switching sequence for CAF mode operation is illustrated in FIG. 5A-5C, with associated waveforms illustrated in FIG. 6.

CAFB Operating Mode

The CAFB mode of operation may be characterized by four switching states, illustrated in FIGS. 2A-2D, respectively. CAFB switching state A, illustrated in FIG. 2A may be considered the start of the switching cycle, and commences when clamp switch Mcl 104 is OFF, auxiliary switch Maux 116 is ON, and main switch Mmain 102 has just turned ON. The primary current IP 201 starts to flow from bulk capacitor Cbk 108 (i.e., DC bus 110), through closed auxiliary switch Maux 116, primary winding Lp 112 of transformer TX 114, input choke Lck 106, and closed main switch Mmain 102. More specifically, input current IP 201 ramps up from zero, being controlled by input choke Lck 106. At the same time, secondary winding Ls is forward coupled, and its voltage turns on output rectifier diode DR 130, allowing secondary current IS 203 to be delivered to output capacitor Co 128. This facilitates a direct transfer of energy from bulk capacitor Cbk 108 (i.e., DC bus 110) to the output (Vout). During this state, input choke Lck 106 is positively energized (i.e., current is flowing toward main switch Mmain 102 and ground). CAFB switching state A ends when auxiliary switch Maux 116 is opened. Timing for the opening of auxiliary switch Maux 116 is discussed further below.

Figure 2A:
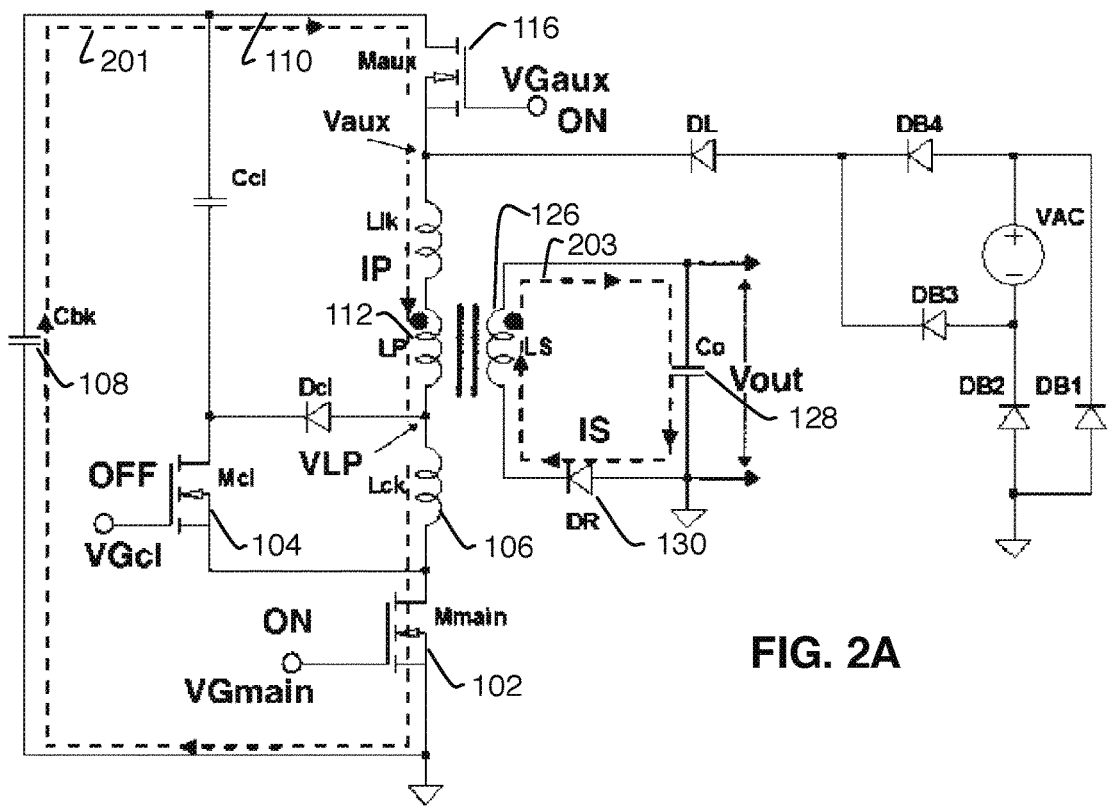
FIGS. 2A-2D illustrate switching states of the CAFB converter operating in the CAFB mode.
Figure 2B:
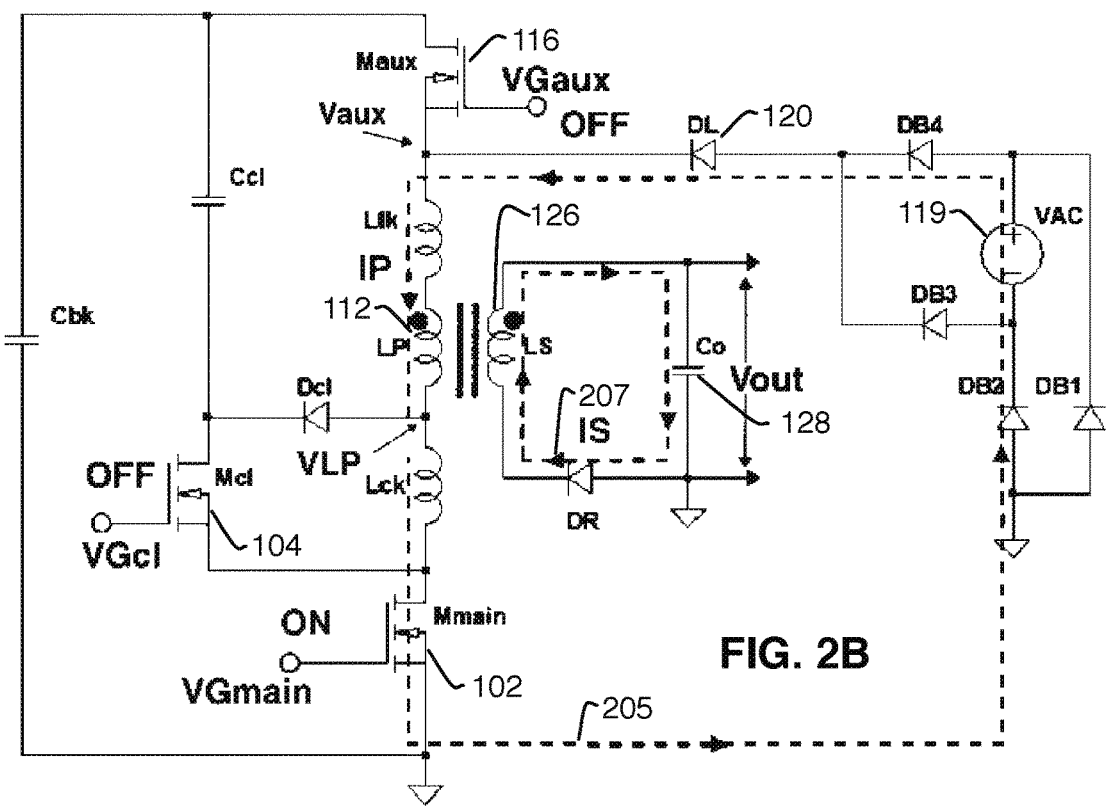

CAFB switching state B, illustrated in FIG. 2B, begins when auxiliary switch Maux 116 is turned OFF, while clamp switch Mcl 104 remains OFF, and main switch Mmain 102 remains ON. Because auxiliary switch Maux 116 has opened, flow of primary current IP 203 switches from being sourced by bulk cap Cbk 108/DC bus 110 to being sourced by input AC source Vac 119 through diode DL 120. Primary current IP 205 continues to ramp-up at a rate dictated by the instantaneous AC voltage level. Primary winding Lp 112 of transformer TX 114 remains coupled with secondary winding Ls 126, which allows secondary current IS 207 to continue to be delivered to output capacitor Co 128. Thus, direct transfer of energy from AC source 119 to the output (Vout) continues. Additionally, input choke Lck 106 remains positively energized (i.e., current is flowing toward main switch Mmain 102 and ground). CAFB switching state B ends when main switch Mmain 102 is opened.

The opening timing of main switch Mmain 102 is a function of the output power requirement of the load coupled to the circuit across output capacitor Co 128. In some embodiments, main switch Mmain 102 may have a duty cycle that is current controlled with respect to the peak primary current, and which operates using a feedback loop of the output voltage Vout (i.e., the voltage across output capacitor Co 128).

Figure 2C:
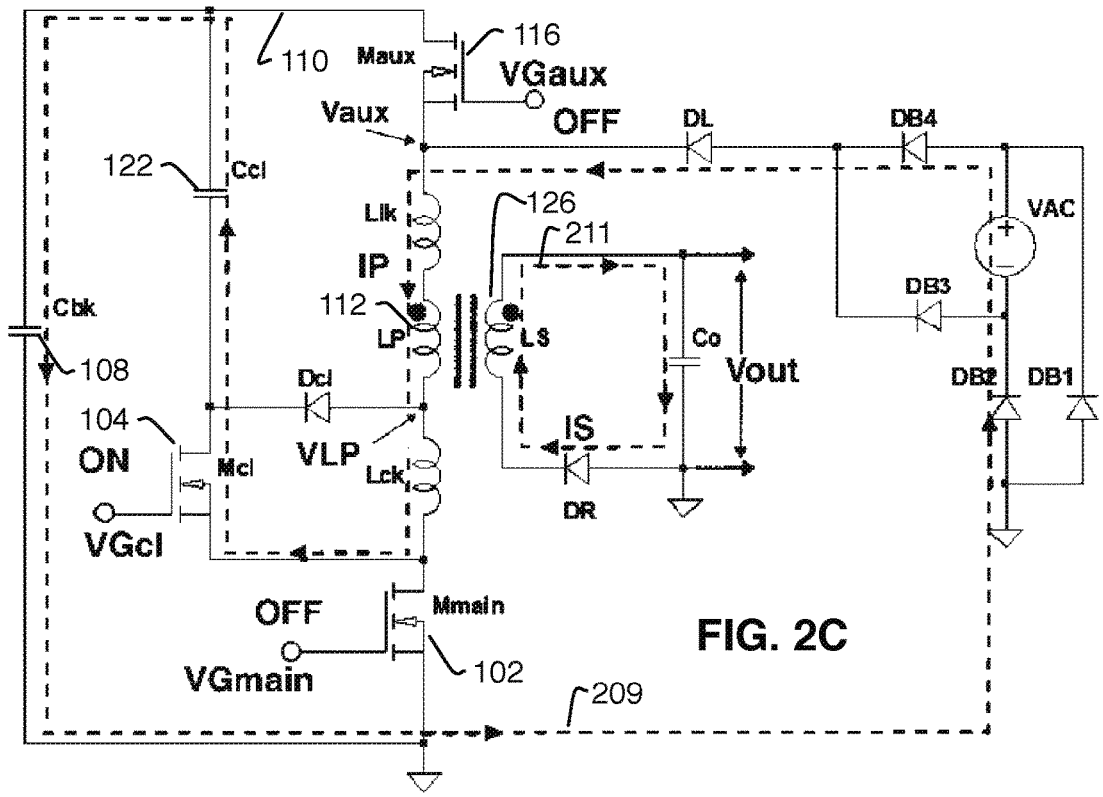

CAFB switching state C, illustrated in FIG. 2C, begins when main switch Mmain 102 is turned OFF, which is followed shortly thereafter by clamp switch Mcl 104 turning ON, while auxiliary switch Maux 116 remains OFF. The flow of primary current IP 209 switches from passing through main switch Mmain 102 to passing through clamp switch Mcl 104 and clamp capacitor Ccl 122, to DC bus 110, returning to ground through bulk capacitor Cbk 108. Additionally, primary current IP 209 begins to ramp down. Primary winding Lp 112 of transformer Lp 114, remains coupled with secondary winding Ls, allowing the secondary current IS 211 to be delivered to the output capacitor Co 128. Direct transfer of energy from AC input source 119 to the output (Vout) continues. Additionally, as noted above, bulk capacitor Cbk 108 is being charged through the use of input choke Lck 106. Input choke Lck 106 remains positively energized (i.e., current is flowing toward main switch Mmain 102 and ground), although the energy stored in input choke Lck 106 is decreasing. Thus, CAFB switching state C achieves three energy transfers: (1) continued energy delivery to output (because current is still flowing through primary winding LP 112), (2) delivery of energy to clamp capacitor Ccl 122, and (3) delivery of energy to bulk capacitor Cbk 108. CAFB switching state C ends when primary current IP 209 reaches zero.

Figure 2D:
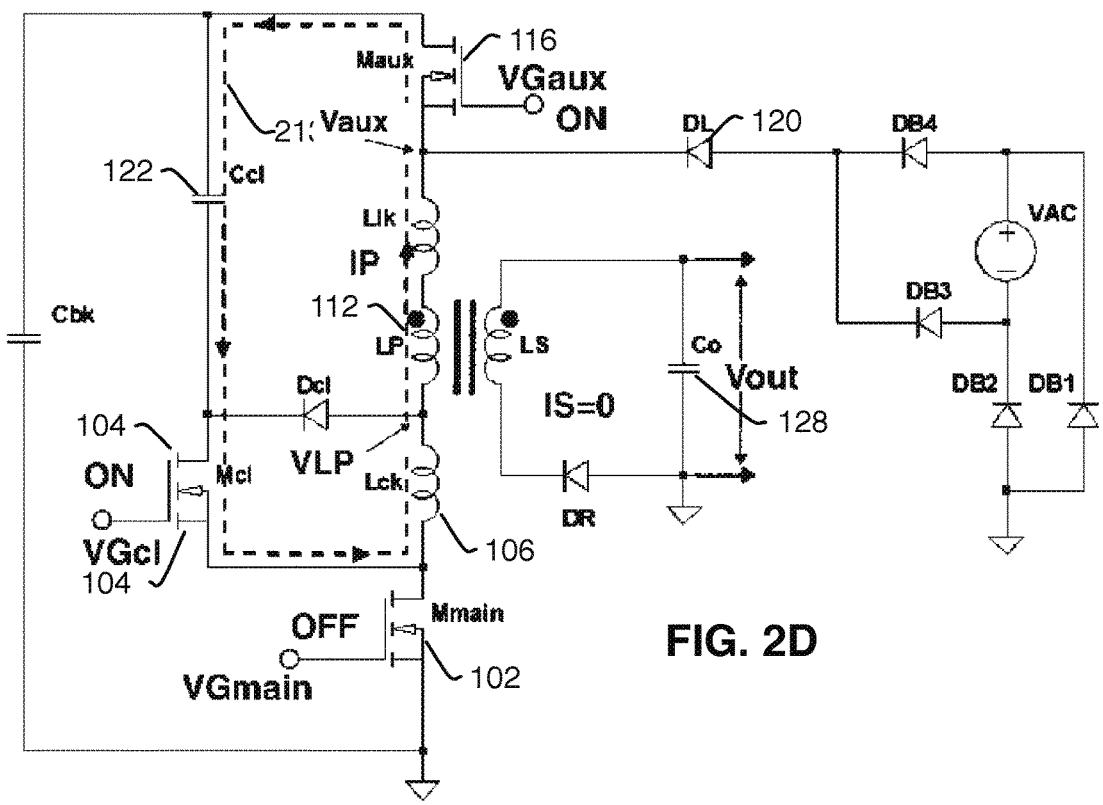

CAFB switching state D, illustrated in FIG. 2D, begins when primary current IP 213 changes polarity, i.e., reverses. As a result, diode DL 120 turns OFF, which is followed shortly thereafter by auxiliary switch Maux 116 being turned ON, while clamp switch Mcl 104 remains ON, and main switch Mmain 102 stays OFF. (The turn on of auxiliary switch Maux 116 may be a zero voltage switching (ZVS) event because the body diode of auxiliary switch Maux 116 will begin conducting before switching ON.) Primary current IP 213 continues ramping down (i.e., becomes increasingly negative) at a rate dictated by the voltage across clamp capacitor Ccl 122 and the inductance of input choke Lck 106. Energy flows from the clamp capacitor Ccl 122 to primary winding Lp 112 of transformer TX 114, facilitating the reset of the transformer, the reset of clamp capacitor Ccl 122, and negatively energizing input choke Lck 106 (i.e., current is flowing towards primary winding Lp 112).

Additionally, because primary winding Lp 112 has reversed polarity, secondary winding Ls 126 has been forced to reverse polarity as well. As a consequence, rectifier diode DR 130 is turned OFF, and no secondary current is delivered to the output capacitor Co 128 (i.e., IS=0). Thus, no energy transfer from primary to secondary takes place during switching state D; a dead-time occurs. The energy transferred from clamp capacitor Ccl 122 to input choke Lck 106 can be used to achieve zero voltage switching (ZVS) of main switch Mmain 102 at the beginning of the next switching cycle (i.e., switching state A, discussed above). CAFB switching state D ends when clamp switch Mcl 104 turns OFF, and CAFB switching state A commences again with the closure of main switch Mmain 102.

Figure 3:
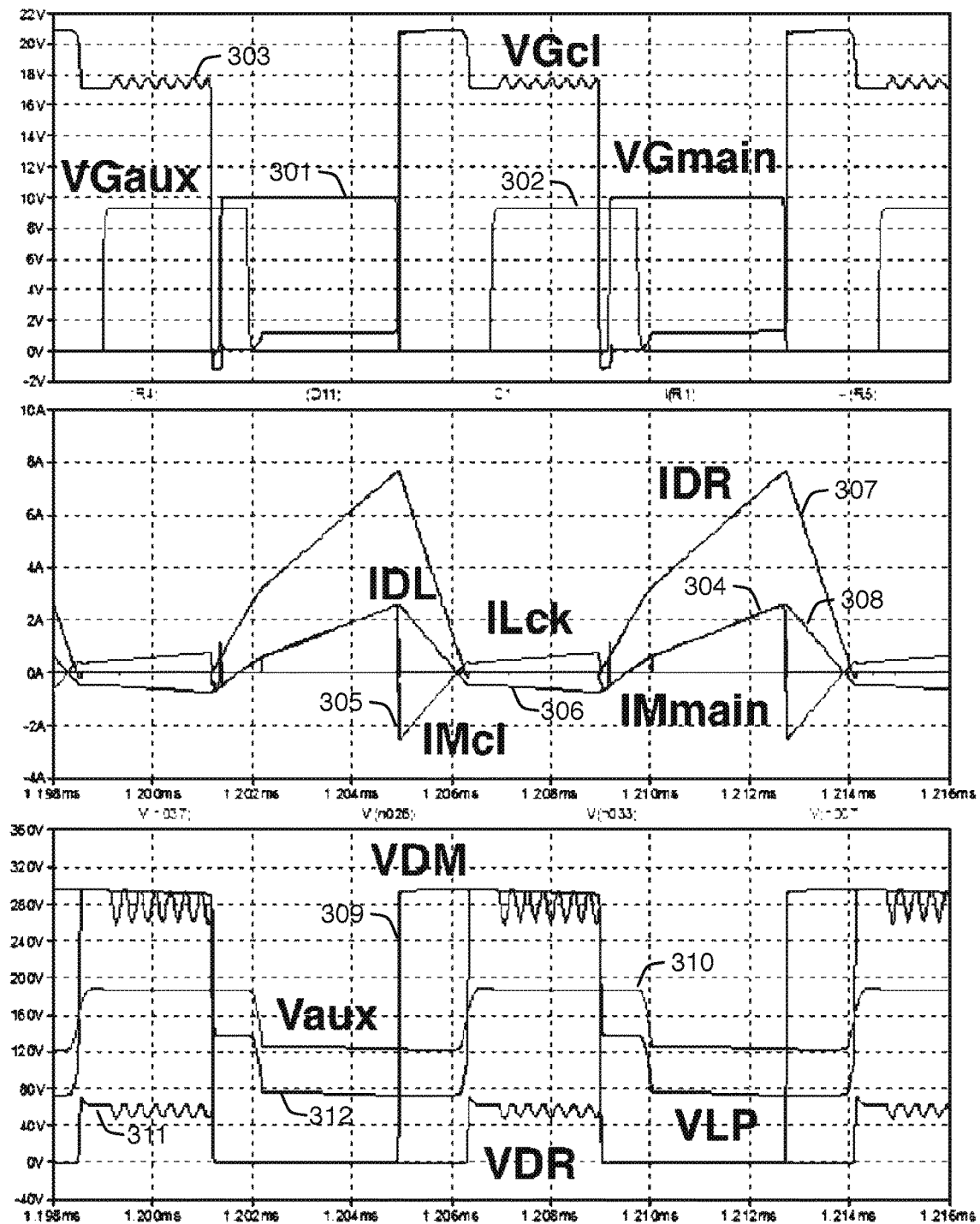
FIG. 3 illustrates various waveforms of the CAFB converter operating in the CAFB mode.

FIG. 3 shows various voltage and current waveforms CAFB operation and the related switching states discussed above with respect to FIGS. 2A-2D. The upper plot illustrates the gate drive voltages VGmain 301 (for main switch MMain 102), VGaux 302 (for auxiliary switch Maux 116), and VGcl 303 for clamp switch Mcl 104). The middle plot illustrates current for various elements of the circuit. These include the current IMmain 304 through main switch Mmain 102, the current IMcl 305 through clamp switch Mcl 104, the current ILck 306 through input choke Lck 106, the current IDR 307 through output rectifier diode Dr 130, and the current IDL 308 through diode DL 120. The lower plot illustrates additional voltages VDM 309 (the voltage across main switch Mmain 102), Vaux 310 (the voltage at auxiliary switch Maux 116), VDR 311 (the voltage across output rectifier diode DR 130), and VLP 312 (the voltage at primary winding Lp 112 of transformer TX 114).

Figure 4:
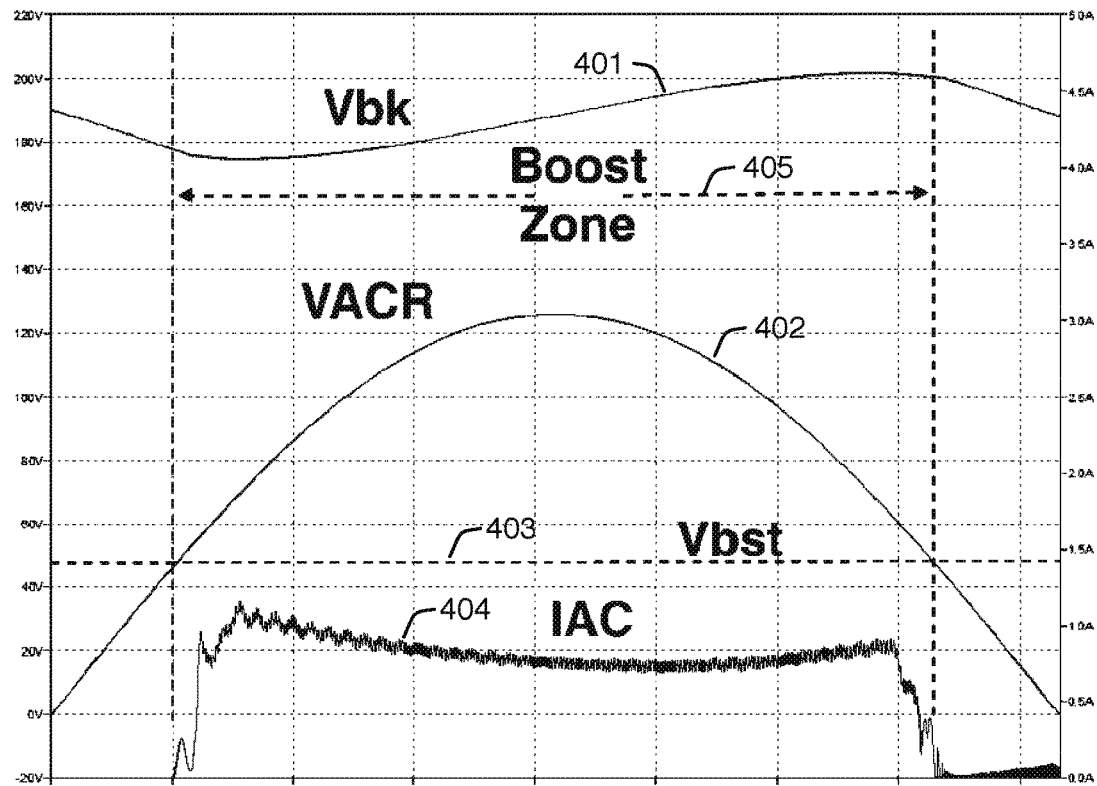
FIG. 4 illustrates rectified AC input voltage, DC bus voltage, input current, and boost threshold voltage for a CAFB converter.

During each switching cycle of CAFB operation, energy is taken from bulk capacitor Cbk 108 (i.e., DC bus 110) at the beginning of the cycle, and then the energy is delivered back to bulk capacitor Cbk 108 (i.e., DC bus 110) from the AC input 119, through the clamp capacitor Ccl 122, with a net positive flow toward bulk capacitor Cbk 108 (i.e., DC bus 110), meaning that the bulk capacitor Cbk 108 is charging. As a result, with each switching cycle the input AC voltage (from AC input 119) is boosted to a higher level Vbk, i.e., the voltage across bulk capacitor Cbk 108/the voltage of DC bus 110. The resulting DC bus voltage Vbk 401 and its general correlation to the rectified input voltage VACR 402 is shown in FIG. 4.

CAF Operating Mode

As noted above, the CAFB converter 100 may be operated in two modes, the CAFB mode (described above), and the CAF mode (in which the boost function is not used). Further details of the CAF mode may be understood with reference to the switching states illustrated in FIGS. 5A-5C and the waveforms illustrated in FIG. 6.

More specifically, the CAF operating mode may be characterized by three switching states, illustrated in FIGS. 5A-5C. CAF switching state A, illustrated in FIG. 5A, is the start of the switching cycle for CAF operation. In this state, clamp switch Mcl 104 is OFF, auxiliary switch Maux 116 is ON, and main switch Mmain 102 has just turned ON. The primary current IP 501 starts to flow from bulk capacitor Cbk 108 (i.e., DC bus 110), through primary winding Lp 112 of the transformer TX 114. The ramp-up of primary current IP 501 (from zero) is controlled by input choke Lck 106. Secondary winding Ls 126 of transformer TX 114 is forward coupled, and its voltage turns on output rectifier diode DR 130, allowing secondary current IS 503 to be delivered to output capacitor Co 128. Thus, direct transfer of energy from bulk capacitor Cbk 108 (i.e., DC bus 110) to the output (Vo) is taking place. Additionally, input choke Lck 106 is positively energized (i.e., current is flowing toward main switch Mmain 102 and ground).

CAF switching state B, illustrated in FIG. 5B, begins when main switch Mmain 102 is turned OFF, followed shortly thereafter by clamp switch Mcl 104 turning ON, while auxiliary switch Maux 116 remains ON. Primary current IP 505 switches from flowing through main switch Mmain 102 to flowing through clamp switch Mcl 104, and closing through clamp capacitor Ccl 122. Additionally, primary current IP 505 begins to ramp down. Primary winding Lp 112 of the transformer TX 114 remains forward coupled with secondary winding Ls 126, allowing continued delivery of secondary current IS 507 to output capacitor Co 128. Thus, direct transfer of energy from input choke Lck 106 to the output (Vo) takes place. CAF switching state B ends when primary current IP 505 reaches zero.

CAF switching state C, illustrated in FIG. 5C, begins when primary current IP 507 reverses polarity, while auxiliary switch Maux 116 and clamp switch Mcl 104 stay ON and main switch Mmain 102 stays OFF. The primary current IP 507 ramps down (becoming negative) at a rate dictated by the voltage across clamp capacitor Ccl 122 and the inductance value of input choke Lck 106. Energy flows from the clamp capacitor Ccl 122 to primary winding LP 112, which facilitates the reset of the transformer TX 114, the reset of the clamp capacitor Ccl 122, and negatively energizes input choke Lck 106 (i.e., current is flowing towards primary winding Lp 112). Primary winding Lp 112 has reversed polarity, which forces secondary winding Ls 126 to reverse polarity as well. The polarity reversal of secondary winding Ls 126 turns OFF output rectifier diode DR 130. As a result, no secondary current IS is delivered to the output capacitor Co 128, and no energy is transferred between primary and secondary. In other words, there is a dead time in place. The energy pushed back from clamp capacitor Ccl 122 to input choke Lck 106 can be used to achieve zero voltage switching (ZVS) across main switch Mmain 102 at the begging of the next switching cycle. CAF switching state C ends when clamp switch Mcl 104 turns OFF, returning to CAF switching state A.

Figure 6:
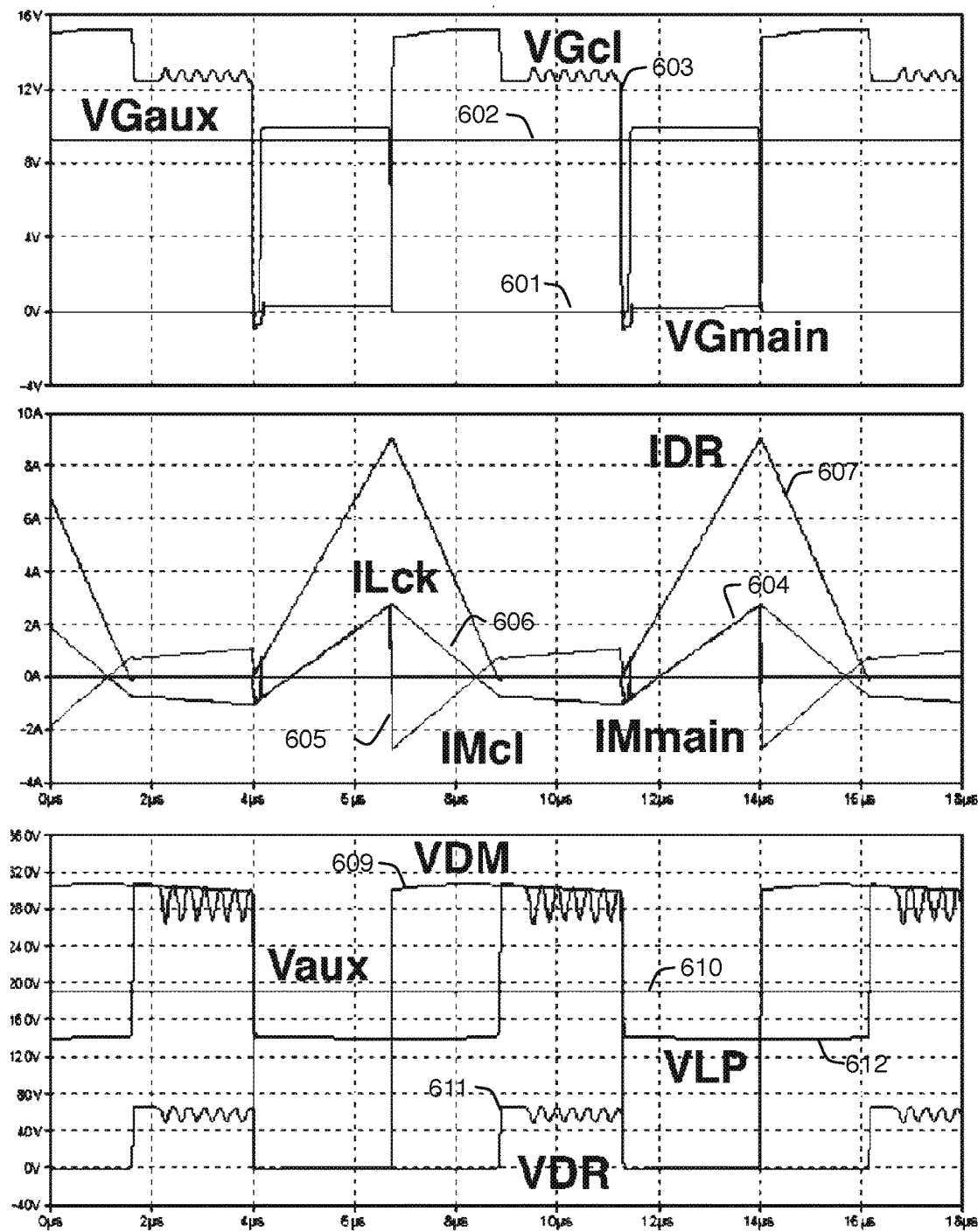
FIG. 6 illustrates various waveforms of the CAFB converter operating in the CAF mode.

FIG. 6 shows various voltage and current waveforms associated with CAF operation and the related switching states discussed above with respect to FIGS. 5A-5C. The upper plot illustrates the gate drive voltages VGmain 601 (for main switch MMain 102), VGaux 602 (for auxiliary switch Maux 116), and VGcl 603 (for clamp switch Mcl 104). The middle plot illustrates current for various elements of the circuit. These include the current IMmain 604 through main switch Mmain 102, the current IMcl 605 through clamp switch Mcl 104, the current ILck 606 through input choke Lck 106, the current IDR 607 through output rectifier diode DR 130. The lower plot illustrates additional voltages VDM 609 (the voltage across main switch Mmain 102), Vaux 610 (the voltage at auxiliary switch Maux 116), VDR 611 (the voltage across output rectifier diode DR 130), and VLP 612 (the voltage at primary winding Lp 112 of transformer TX 114).

Switching Between CAFB and CAF Operating Modes

Auxiliary switch Maux 116 may be used to determine whether the converter operates in the CAFB mode of operation (in which the boosting function is enabled) or in the CAF mode of operation (in which the boosting function is disabled). As described above, auxiliary switch Maux 116 can selectively connect transformer TX 114 to either: (1) DC bus 110 (having voltage Vbk), which is supported by bulk capacitor Cbk 108; or (2) rectified AC input voltage VACR (402; FIG. 4) during a transformer switching cycle. Thus, referring to FIG. 4, auxiliary switch Maux 116 is controlled with reference to the rectified AC voltage level 402.

More specifically, the boost mode of operation (i.e., CAFB operation) is enabled inside the boost zone 405 (described below), and energy is taken from both the DC bus 110 (bulk capacitor Cbk 108) and VAC source. In the CAFB mode of operation, auxiliary switch VGaux 116 is operated as described above with respect to FIGS. 2A-2D. The boost mode of operation is disabled (i.e., the converter is operated in CAF mode) outside the boost zone 405 (described below), in which case energy is taken solely from bulk capacitor Cbk 108. In the CAF mode, auxiliary switch Maux 116 is continuously maintained ON, making a permanent connection from primary winding LP 112 of transformer TX 114 to DC bus 110 (supported by bulk capacitor Cbk 108). This continuous connection facilitates complete flow of energy from DC bus 110/bulk capacitor Cbk 108, through transformer TX 114, to the output during a switching cycle.

Boost zone 405 is defined by the region in which rectified AC input voltage VACR 402 is greater than boost voltage Vbst 403. Boost voltage threshold Vbst 403 is the voltage limit below which boost operation becomes inefficient, and is therefore not employed. This voltage limit may be determined empirically, or may also be determined through simulation or testing of an actual circuit. As further illustrated in FIG. 4, the AC input current IAC 404 has a relatively low amplitude and is spread across a relatively large portion of the AC line cycle. This results in a relatively low RMS value for AC input current IAC 404, which provides for lower power losses and reduced stress on bridge rectifier 118. In general, it may be preferable to increase the boost zone as wide as possible, meaning having as low a boost voltage threshold Vbst 403 as possible, as this will result in lower AC input currents IAC 404 as well as improved power factor. However, both efficiency and harmonic distortion concerns provide a limit on the lower level of boost voltage threshold Vbst 403.

Figure 7:
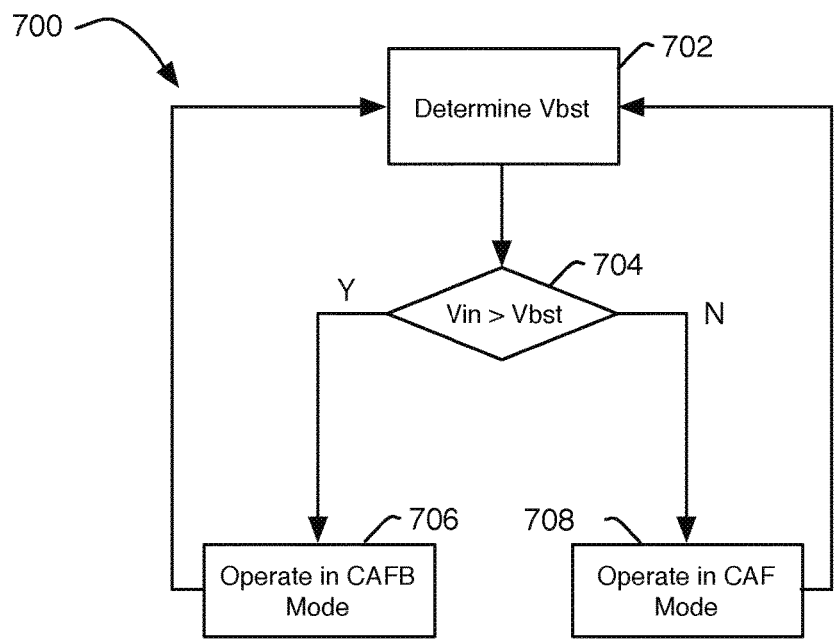
FIG. 7 illustrates a method for controlling a CAFB converter and for switching between the CAFB and CAF operating modes.

FIG. 7 illustrates a flowchart of a method 700 for switching between a CAFB operating mode and a CAF operating mode of a CAFB converter as described above. Initially, at block a boost voltage threshold Vbst is determined as described above. Then input voltage of the converter Vin (e.g., VACR as described above) is then compared to the determined boost voltage threshold Vbst in block 704. If the input voltage Vin is greater than the boost voltage threshold Vbst, then the converter is operated in CAFB mode (block 706), using the switching sequence described above with reference to FIGS. 2A-2D. If the input voltage Vin is not greater than the boost voltage threshold Vbst, then the converter is operated in CAF mode (block 708), using the switching sequence described above with reference to FIGS. 5A-5C.

CONCLUSION

The current fed active clamp forward boost converter circuit described herein uses forward conversion operation (as opposed to flyback operation) of transformer TX 114 for direct energy delivery to a load. This type of operation can provide a number of advantages, which can include:
(1) Lower DC bus voltage, voltage range, and reduced energy storage requirements, allowing for a decreased size, capacitance, and/or voltage rating of bulk capacitor Cbk 108;
(2) A wide input voltage range (e.g., 90 Vac to 250 Vac);
(3) Increased operating efficiency.
(4) Improved power factor;
(5) Reduced voltage/current stresses on various components including switches and rectifiers;
(6) Zero Voltage Switching (ZVS) across all primary and secondary switches and rectifiers;
(7) Zero Current Switching (ZCS) across secondary rectifier;
(8) Reduced voltage switching across transformer, resulting in low common mode noise; and
(9) Integration of transformer TX 112 and input choke Lck 106 into a single component (e.g., a high leakage transformer), similar to LLC applications.

Described above are various features and embodiments relating to a current fed, active clamp, forward, boost power converter. Such converters may be used in a variety of applications, but may be particular advantageous when used in conjunction with portable electronic devices such as mobile telephones, smart phones, tablet computers, laptop computers, media players, and the like, as well as the peripherals associated therewith. Such associated peripherals can include input devices (such as keyboards, mice, touchpads, tablets, and the like), output devices (such as headphones or speakers), storage devices, or any other peripheral.

Additionally, although numerous specific features and various embodiments have been described, it is to be understood that, unless otherwise noted as being mutually exclusive, the various features and embodiments may be combined in any of the various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:
1. A current fed active clamp forward boost converter comprising:
    a primary coil coupled to a rectified input voltage;
    an input choke serially coupled between the primary coil and a main switch; and
    a clamp switch electrically coupled across the input choke via a clamp diode, the clamp switch being further coupled to a first terminal of a clamp capacitor having a second terminal coupled to a DC bus of the converter, the DC bus being selectively decouplable from the rectified input voltage and the primary coil by an auxiliary switch; wherein:
        the main switch is configured to be operated to regulate a voltage appearing at an output of the converter;
        the clamp switch is configured to operate alternately with respect to the main switch; and
        the auxiliary switch is configured to selectively couple the DC bus voltage to the primary coil when the rectified input voltage is greater than a boost voltage threshold.
2. The current fed active clamp forward boost converter of claim 1 wherein the converter receives the rectified input voltage at a junction between the auxiliary switch and the primary winding via a fast diode.
3. The current fed active clamp forward boost converter of claim 1 further comprising a secondary coil magnetically forward coupled to the primary coil and a rectifier operatively coupled between the output of the converter and the secondary coil and configured so as to permit forward current through the secondary coil and to prevent reverse current through the secondary coil.
4. The current fed active clamp forward boost converter of claim 1 wherein the primary and secondary coils are primary and secondary windings of a transformer.
5. The current fed active clamp forward boost converter of claim 1 wherein the choke coil is integral with the primary coil.
6. The current fed active clamp forward boost converter of claim 5 wherein the transformer is a high leakage transformer.
7. The current fed active clamp forward boost converter of claim 1 wherein the clamp diode is operatively coupled to at least one of the primary coil and the input choke and to the clamp capacitor so as to clamp a ringing voltage associated with the at least one of the primary coil and the input choke and one or more parasitic capacitances of the circuit.

8. The current fed active clamp forward boost converter of claim 1 wherein the main switch is configured to be operated to regulate the voltage appearing at an output of the converter by controlling a peak current through the primary coil responsive to a voltage feedback loop operatively coupled to a voltage at the output of the converter.

9. A method of operating a current fed active clamp forward boost (CAFB) converter, the CAFB converter comprising a main switch, a clamp switch, and an auxiliary switch, the method comprising:
   comparing an input voltage of a CAFB converter to a boost voltage threshold; and
   operating the main switch, the clamp switch, and the auxiliary switch of the CAFB converter in a CAFB mode if the input voltage is greater than the boost voltage threshold, wherein operating the main switch, the clamp switch, and the auxiliary switch of the CAFB converter in the CAFB mode comprises operating the auxiliary switch of the CAFB converter to selectively couple a DC bus voltage of the converter to a primary coil of the CAFB converter, wherein operating the auxiliary switch of the CAFB converter to selectively couple a DC bus voltage of the converter to a primary coil of the CAFB converter comprises cycling through a sequence of switching states, the sequence of switching states comprising:
      a first switching state, commencing when the main switch is turned on, the clamp switch is turned off, and the auxiliary switch is on;
      a second switching state commencing when the auxiliary switch is opened with the main switch remaining on and the clamp switch remaining off;
      a third switching state commencing when the main switch is turned off and the clamp switch is turned on, with the auxiliary switch remaining off; and
      a fourth switching state commencing when the auxiliary switch is turned on, with the main switch remaining off, and the clamp switch remaining on.

10. The method of claim 9 wherein the main switch is turned off, commencing the third switching state, to regulate a voltage appearing at an output of the CAFB converter.

11. The method of claim 10 wherein the main switch is turned off, commencing the third switching state, to regulate a voltage appearing at an output of the CAFB converter by controlling a peak current through the primary coil responsive to a voltage feedback loop operatively coupled to a voltage at the output of the converter.

12. The method of claim 9 further comprising operating the main switch, the clamp switch, and the auxiliary switch of the CAFB converter in a current fed active clamp forward (CAF) mode if the input voltage is not greater than the boost voltage threshold.

13. The method of claim 12 wherein operating the main switch, the clamp switch, and the auxiliary switch of the CAFB converter in the CAF mode comprises closing the auxiliary switch of the CAFB converter to couple a DC bus voltage of the converter to a primary coil of the CAFB converter.

14. The method of claim 13 wherein operating the CAFB converter in the CAF mode comprises cycling through a sequence of switching states, the sequence of switching states comprising:
   a first switching state, commencing when a main switch is turned on, a clamp switch is turned off, and the auxiliary switch is on;
   a second switching state commencing when the main switch is turned off, the clamp switch is turned on, with the auxiliary switch remaining on; and
   a third switching state commencing when a current through a primary coil of the CAFB converter reverses polarity, while main switch remains off, and the clamp switch and the auxiliary switch remain on.

15. The method of claim 14 wherein the main switch is turned off, commencing the second switching state, to regulate a voltage appearing at an output of the CAFB converter.

16. The method of claim 15 wherein the main switch is turned off, commencing the second switching state, to regulate a voltage appearing at an output of the CAFB converter by controlling a peak current through the primary coil responsive to a voltage feedback loop operatively coupled to a voltage at the output of the converter.

17. A method of operating a current fed active clamp forward boost (CAFB) converter, the CAFB converter comprising a main switch, a clamp switch, and an auxiliary switch, the method comprising:
   comparing an input voltage of a CAFB converter to a boost voltage threshold; and
   operating the main switch, the clamp switch, and the auxiliary switch of the CAFB converter in a current fed active clamp forward (CAF) mode if the input voltage is not greater than the boost voltage threshold;
   wherein operating the CAFB converter in the CAF mode comprises cycling through a sequence of switching states, the sequence of switching states comprising:
      a first switching state, commencing when a main switch is turned on, a clamp switch is turned off, and the auxiliary switch is on;
      a second switching state commencing when the main switch is turned off, the clamp switch is turned on, with the auxiliary switch remaining on; and
      a third switching state commencing when a current through a primary coil of the CAFB converter reverses polarity, while main switch remains off, and the clamp switch and the auxiliary switch remain on.

18. The method of claim 17 wherein the main switch is turned off, commencing the second switching state, to regulate a voltage appearing at an output of the CAFB converter.

19. The method of claim 18 wherein the main switch is turned off, commencing the second switching state, to regulate a voltage appearing at an output of the CAFB converter by controlling a peak current through the primary coil responsive to a voltage feedback loop operatively coupled to a voltage at the output of the converter.

* * * * *